US012757242B2

(12) United States Patent
Liu et al.

(10) Patent No.: US 12,757,242 B2
(45) Date of Patent: Oct. 6, 2026

(54) METHOD FOR RECEIVING PDSCH, APPARATUS FOR RECEIVING PDSCH AND PROCESSOR-READABLE STORAGE MEDIUM

(71) Applicant: DATANG MOBILE COMMUNICATIONS EQUIPMENT CO., LTD., Beijing (CN)

(72) Inventors: Miaomiao Liu, Beijing (CN); Junwei Wang, Beijing (CN); Teng Ma, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 412 days.

(21) Appl. No.: 18/260,577

(22) PCT Filed: Nov. 30, 2021

(86) PCT No.: PCT/CN2021/134369
§ 371 (c)(1),
(2) Date: Jul. 6, 2023

(87) PCT Pub. No.: WO2022/148184
PCT Pub. Date: Jul. 14, 2022

(65) Prior Publication Data

US 2024/0306184 A1 Sep. 12, 2024

(30) Foreign Application Priority Data

Jan. 8, 2021 (CN) ......................... 202110023269.1

(51) Int. Cl.
*H04W 72/563* (2023.01)
*H04W 72/12* (2023.01)

(52) U.S. Cl.
CPC ......... *H04W 72/563* (2023.01); *H04W 72/12* (2013.01)

(58) Field of Classification Search
CPC ..... H04W 72/12; H04W 72/23; H04W 72/51; H04W 72/53; H04W 72/56; H04W 72/563
See application file for complete search history.

(56) References Cited

U.S. PATENT DOCUMENTS 10,070,459 B2 * 9/2018 Bergman .......... H04W 72/1215
2017/0019913 A1 1/2017 Ahn et al.
(Continued)

FOREIGN PATENT DOCUMENTS

CN 101350940 A 1/2009
CN 110324127 A 10/2019
(Continued)

OTHER PUBLICATIONS

International Search Report for PCT Application No. PCT/CN2021/134369 issued on Jan. 29, 2022 and its English Translation provided by WIPO.
(Continued)

*Primary Examiner* — Eron J Sorrell
(74) *Attorney, Agent, or Firm* — Ladas & Parry, LLP

(57) ABSTRACT

A method for receiving PDSCH, an apparatus for receiving PDSCH and a processor-readable storage medium are provided in the present disclosure. The method includes: determining, by a terminal, a receiving PDSCH set according to a priority of a candidate physical downlink shared channel PDSCH scheduled by a base station, where quantity of PDSCHs to be received in the receiving PDSCH set meets receiving capability of the terminal; and receiving, by the terminal, data on the PDSCH to be received in the receiving PDSCH set.

16 Claims, 3 Drawing Sheets

(56) References Cited

U.S. PATENT DOCUMENTS

| | | | |
|---|---|---|---|
| 2022/0053470 | A1 | 2/2022 | Chen et al. |
| 2022/0377717 | A1 | 11/2022 | Park et al. |

FOREIGN PATENT DOCUMENTS

| | | | | |
|---|---|---|---|---|
| CN | 111867015 | A | 10/2020 | |
| KR | 20200083217 | A | 7/2020 | |
| WO | WO-2015065261 | A1 * | 5/2015 | .......... H04W 72/535 |
| WO | 2020069165 | A1 | 4/2020 | |
| WO | 2020255415 | A1 | 12/2020 | |

OTHER PUBLICATIONS

Written Opinion for PCT Application No. PCT/CN2021/134369 issued on Jan. 29, 2022 and its English Translation provided by WIPO.
International Preliminary Report on Patentability for PCT Application No. PCT/CN2021/134369 issued on Jul. 4, 2023 and its English Translation provided by WIPO.
"Other issues for URLLC," 3GPP TSG RAN WG1 #98bis R1-1910227, Chongqing, China, Oct. 14-20, 2019, Source: vivo, Agenda Item: 7.2.6.7, all pages.
Extended European Search Report for the corresponding European Patent Application No. 21917225.1 issued by the European Patent Office on Apr. 22, 2024.

* cited by examiner

METHOD FOR RECEIVING PDSCH, APPARATUS FOR RECEIVING PDSCH AND PROCESSOR-READABLE STORAGE MEDIUM

CROSS-REFERENCE TO RELATED APPLICATIONS

This application is the U.S. national phase of PCT Application No. PCT/CN2021/134369 filed on Nov. 30, 2021, which claims priority to Chinese Patent Application No. 202110023269.1 filed on Jan. 8, 2021, the disclosures of which are incorporated in their entireties by reference herein.

TECHNICAL FIELD

The present disclosure relates to the field of communications technology, and in particular to a method for receiving PDSCH, an apparatus for receiving PDSCH and a processor-readable storage medium.

BACKGROUND

With the increasing popularity of mobile video services, peer-to-peer multicast/broadcast streams, software upgrades through mobile networks, group communications, and broadcast/multicast Internet of Things applications, the global mobile communication industry has reached a consensus that the fifth generation mobile communication technology (5th Generation Mobile Communication Technology, 5G) networks need to have the ability to flexibly and dynamically allocate radio spectrum and network resources between unicast and multicast services, and need to support independent deployment for broadcast/multicast networks.

In one receiving time unit, the maximum quantity of service data physical downlink shared channels (Physical downlink shared channel, PDSCH) that the terminal can receive is determined. In the New Radio Multicast and Broadcast Services (New Radio Multicast and Broadcast Services, NR MBS) system, the terminal (User Equipment, UE) may need to receive PDSCH of broadcast, multicast and unicast services simultaneously, which includes both dynamically scheduling PDSCH and semi-persistent scheduling (Semi-Persistent Scheduling, SPS) PDSCH. Therefore, the base station may schedule the PDSCH exceeding the capability of the UE in a time slot (slot), and how the terminal selects the PDSCH that meets the capability requirements of the UE from multiple PDSCHs for reception has become an urgent problem to be solved.

SUMMARY

The present disclosure provides a method for receiving PDSCH, an apparatus for receiving PDSCH and a processor-readable storage medium, so as to solve the problem that the terminal cannot determine the received PDSCH in a case that the scheduling of the PDSCH by the base station exceeds the receiving capability of the terminal.

An embodiment of the present disclosure provides a method for receiving PDSCH, which includes:

determining, by a terminal, a receiving PDSCH set according to a priority of a candidate physical downlink shared channel PDSCH scheduled by a base station, where quantity of PDSCHs to be received in the receiving PDSCH set meets receiving capability of the terminal;

receiving, by the terminal, data on the PDSCH to be received in the receiving PDSCH set.

Optionally, the determining, by the terminal, the receiving PDSCH set according to the priority of the candidate PDSCH scheduled by the base station includes one of following:

determining the receiving PDSCH set according to PDSCH with a highest priority in the candidate PDSCH set, where the quantity of PDSCHs to be received in the receiving PDSCH set meets the receiving capability of the terminal;

excluding PDSCH with a lowest priority in the candidate PDSCH set, and determining the candidate PDSCH set subjected to the exclusion process as the receiving PDSCH set, where the quantity of PDSCHs to be received in the receiving PDSCH set meets the receiving capability of the terminal.

Optionally, the determining the receiving PDSCH set according to the PDSCH with the highest priority in the candidate PDSCH set, includes:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

Optionally, the excluding the PDSCH with the lowest priority in the candidate PDSCH set, and the determining the candidate PDSCH set subjected to the exclusion process as the receiving PDSCH set, includes:

step 1: deleting a second PDSCH with a lowest priority in the candidate PDSCH set to obtain a second candidate set, where quantity of PDSCHs in the second candidate set meets the receiving capability of the terminal, determining, in a case that there is no overlapped PDSCH in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;

step 2: using the second candidate set as the candidate PDSCH set, and repeating the step 1.

Optionally, the method further includes:

determining, in a case that two PDSCHs meet a first condition, that the two PDSCHs do not overlap in a time domain, where the first condition is: a start time of one of the two PDSCHs is later than an end time of the other PDSCH.

Optionally, the method further includes:

determining, in a case that the two PDSCHs meet a second condition, that the two PDSCHs do not overlap in a frequency domain, where the second condition is: a start resource block RB index number of one of the two PDSCHs is greater than an end RB index number of the other PDSCH.

Optionally, a candidate PDSCH is a PDSCH scheduled by the base station before receiving a target time threshold of a time slot.

Optionally, the method further includes:

receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

An embodiment of the present disclosure provides an apparatus for receiving PDSCH, including: a transceiver, a memory, a processor, and computer program stored in the memory and operable on the processor, where the processor implements, when executing the computer program, the following steps of:

determining a receiving PDSCH set according to a priority of a candidate physical downlink shared channel PDSCH scheduled by a base station, where quantity of PDSCHs to be received in the receiving PDSCH set meets receiving capability of the terminal;

receiving data on the PDSCH to be received in the receiving PDSCH set.

Optionally, the determining, by the terminal, the receiving PDSCH set according to the priority of the candidate PDSCH scheduled by the base station includes one of following:

determining the receiving PDSCH set according to PDSCH with a highest priority in the candidate PDSCH set, where the quantity of PDSCHs to be received in the receiving PDSCH set meets the receiving capability of the terminal;

excluding PDSCH with a lowest priority in the candidate PDSCH set, and determining the candidate PDSCH set subjected to the exclusion process as the receiving PDSCH set, where the quantity of PDSCHs to be received in the receiving PDSCH set meets the receiving capability of the terminal.

Optionally, the determining the receiving PDSCH set according to the PDSCH with the highest priority in the candidate PDSCH set, specially includes:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

Optionally, the excluding the PDSCH with the lowest priority in the candidate PDSCH set, and the determining the candidate PDSCH set subjected to the exclusion process as the receiving PDSCH set, includes:

step 1: deleting a second PDSCH with a lowest priority in the candidate PDSCH set to obtain a second candidate set, where quantity of PDSCHs in the second candidate set meets the receiving capability of the terminal, determining, in a case that there is no overlapped PDSCH in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;

step 2: using the second candidate set as the candidate PDSCH set, and repeating the step 1.

Optionally, when the processor executes the computer program, further configured to implement the following steps of:

determining, in a case that two PDSCHs meet a first condition, that the two PDSCHs do not overlap in a time domain, where the first condition is: a start time of one of the two PDSCHs is later than an end time of the other PDSCH.

Optionally, when the processor executes the computer program, further configured to implement the following steps of:

determining, in a case that the two PDSCHs meet a second condition, that the two PDSCHs do not overlap in a frequency domain, where the second condition is: a start resource block RB index number of one of the two PDSCHs is greater than an end RB index number of the other PDSCH.

Optionally, a candidate PDSCH is a PDSCH scheduled by the base station before receiving a target time threshold of a time slot.

Optionally, the processor is further configured to implement, when executing the computer program, the following steps of:

receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

An embodiment of the present disclosure provides an apparatus for receiving PDSCH, which includes:

a first determining unit, configured to determine a receiving PDSCH set according to a priority of a candidate physical downlink shared channel PDSCH scheduled by a base station, where quantity of PDSCHs to be received in the receiving PDSCH set meets receiving capability of the terminal;

a first receiving unit, configured to receive data on the PDSCH to be received in the receiving PDSCH set.

Optionally, the first determining unit specifically includes one of the following:

a first determining subunit, configured to determine the receiving PDSCH set according to PDSCH with a highest priority in the candidate PDSCH set, where the quantity of PDSCHs to be received in the receiving PDSCH set meets the receiving capability of the terminal;

- a second determining subunit, configured to exclude PDSCH with a lowest priority in the candidate PDSCH set, and determine the candidate PDSCH set subjected to the exclusion process as the receiving PDSCH set, where the quantity of PDSCHs to be received in the receiving PDSCH set meets the receiving capability of the terminal.

Optionally, the first determining subunit is specifically configured to implement:

- step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;
- step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

Optionally, the second determining subunit is specifically configured to implement:

- step 1: deleting a second PDSCH with a lowest priority in the candidate PDSCH set to obtain a second candidate set, where quantity of PDSCHs in the second candidate set meets the receiving capability of the terminal, determining, in a case that there is no PDSCH overlapped in a time domain or a frequency domain in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;
- step 2: using the second candidate set as the candidate PDSCH set, and repeating the step 1.

Optionally, the apparatus further includes:

- a second determining unit, configured to determine, in a case that two PDSCHs meet a first condition, that the two PDSCHs do not overlap in the time domain,
- where the first condition is: a start time of one of the two PDSCHs is later than an end time of the other PDSCH.

Optionally, the apparatus further includes:

- a third determining unit, configured to determine, in a case that the two PDSCHs meet a second condition, that the two PDSCHs do not overlap in the frequency domain,
- where the second condition is: a start resource block RB index number of one of the two PDSCHs is greater than an end RB index number of the other PDSCH.

Optionally, a candidate PDSCH is a PDSCH scheduled by the base station before receiving a target time threshold of a time slot.

Optionally, the apparatus further includes:

- a second receiving unit, configured to receive, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

An embodiment of the present disclosure provides a processor-readable storage medium, on which computer program is stored, where when the computer program is executed by a processor, the steps of the above-mentioned method for receiving PDSCH are implemented.

The beneficial effects of the above-mentioned technical solution in the present disclosure are as follows.

In the embodiment of the present disclosure, the terminal determines the receiving PDSCH set according to the priority of the candidate PDSCH scheduled by the base station, and the quantity of PDSCHs included in the receiving PDSCH set meets the receiving capability of the terminal, so that the terminal can receive multiple data services simultaneously, and can select the type and quantity of the finally received PDSCH according to the service priority to meet user requirements.

DETAILED DESCRIPTION

Figure 1:
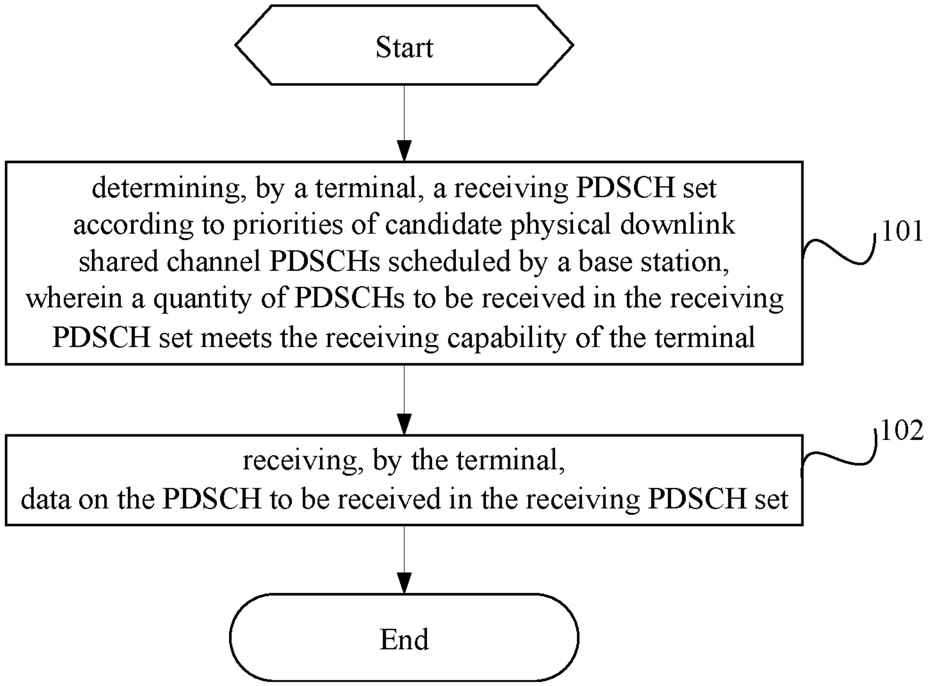
FIG. 1 shows a first flowchart of a method for receiving PDSCH according to an embodiment of the present disclosure.

In order to make the technical problem to be solved by the present disclosure, technical solution and advantages clearer, the following will describe in detail with reference to the drawings and specific embodiments. In the following description, specific details such as specific configurations and components are provided only to help a comprehensive understanding of the embodiments of the present disclosure. Therefore, those skilled in the art should recognize that various changes and modifications of the embodiments described herein can be made without departing from the scope and spirit of the present disclosure. Also, descriptions of well-known functions and constructions are omitted for clarity and conciseness.

It should be understood that reference throughout the specification to "one embodiment" or "an embodiment" means that a particular feature, structure or characteristic related to the embodiment is included in at least one embodiment of the present disclosure. Therefore, appearances of "in one embodiment" or "in an embodiment" in various places throughout the specification are not necessarily referring to the same embodiment. Furthermore, the particular features, structures or characteristics may be combined in any suitable manner in one or more embodiments.

In various embodiments of the present disclosure, it should be understood that the sequence numbers of the following processes do not mean the order of execution, and the execution order of each process should be determined by its functions and internal logic, should not constitute any limitation to the implementation process of the embodiments of the present disclosure.

Additionally, the terms "system" and "network" are often used interchangeably herein.

The term "and/or" in the embodiments of the present disclosure describes the association relationship of associated objects, indicating that there may be three relationships, for example, A and/or B, which may mean these three situations: A exists alone, A and B exist simultaneously, and B exists alone. The character "/" generally indicates that the contextual objects are an "or" relationship.

The term "multiple" in the embodiments of the present disclosure refers to two or more, and other quantifiers are similar.

When describing the embodiments of the present disclosure, some concepts used in the following description are explained first.

(1) Reception of Service Data:

In a time slot, in a case that there are multiple PDSCHs to be delivered, the UE needs to select and exclude PDSCHs according to UE capabilities and service priorities, so as to determine the type and quantity of PDSCHs finally received by the UE.

(2) Service Data Priority:

Different service data have different service priorities, such as: in Ultra-Reliable and Low Latency Communications (Ultra-Reliable and Low Latency Communications, URLLC), Multicast Control Channel (Multicast Control Channel, MCCH) PDSCH (MCCH-PDSCH), MBS and Enhanced Mobile Broadband (Enhanced Mobile Broadband, eMBB), URLLC>MCCH-PDSCH>MBS>eMBB service. When determining and receiving the PDSCH, service priority is a factor that must be considered. Generally, the UE will select to receive service data with higher priority. In the present disclosure, it is assumed that the service priority has been configured, that is, each scheduled data service PDSCH has a corresponding priority level, and the priority values are different.

(3) UE Capability Classification:

The UE receiving capability is defined as the quantity of PDSCHs simultaneously received by the UE in a frequency-division multiplexing (Frequency-division multiplexing, FDM) or/and time-division multiplexing (Time-division multiplexing, TDM) mode within one time slot. Specific UE receiving capability determination parameters may include the following:

the quantity of PDSCHs received in FDM;

the quantity of PDSCHs received in TDM;

the quantity of PDSCHs received in FDM+TDM mode, where FDM refers to allowing multiple data services to be transmitted simultaneously in different frequencies within the same frequency bandwidth. TDM means that within a time slot, multiple data services may be allowed to be transmitted simultaneously at different times. FDM+TDM means that multiple data services may be transmitted in FDM and TDM within one time slot. In the embodiments of the present disclosure, it is discussed that the UE receives N PDSCHs in FDM or TDM mode, then on one carrier, the UE receiving capability can be divided into Capability A (Capability A) and Capability B (Capability B):

Capability A: receiving at most N PDSCHs in TDM mode.

Capability B: receiving at most N PDSCHs in FDM mode.

Specifically, an embodiment of the present disclosure provides a method for receiving PDSCH, which is used to solve the problem that the terminal cannot determine the received PDSCH when the scheduling of the PDSCH by the base station exceeds the receiving capability of the terminal.

As shown in FIG. 1, an embodiment of the present disclosure provides a method for receiving PDSCH, which specifically includes the following steps of:

Step 101, determining, by a terminal, a receiving PDSCH set according to a priority of a candidate physical downlink shared channel PDSCH scheduled by a base station, where quantity of PDSCHs to be received in the receiving PDSCH set meets receiving capability of the terminal;

In this embodiment, the base station may schedule PDSCHs exceeding the receiving capability of the terminal in one time slot. For example, the maximum receiving capability of the terminal is N PDSCHs, and the quantity of PDSCHs scheduled by the base station is greater than N. The candidate PDSCH is the PDSCH scheduled by the base station in one time slot, and there may be multiple ones. The terminal determines the PDSCH to be received from the candidate PDSCH, that is, determines the PDSCH to be received. Specifically, the terminal may determine the PDSCH to be received according to the priority of each candidate PDSCH, wherein the priority of the candidate PDSCH may be protocol preconfiguration.

The receiving PDSCH set determined by the terminal may include multiple PDSCHs, and the quantity of PDSCHs meets the receiving capability of the terminal. The meeting the receiving capability of the terminal means that the quantity of PDSCHs in the receiving PDSCH set is less than or equal to the maximum receiving capability of the terminal.

Step 102, receiving, by the terminal, data on the PDSCH to be received in the receiving PDSCH set, and receiving, after the terminal determines the receiving PDSCH set, data on the PDSCH included in the receiving PDSCH set.

In the embodiment of the present disclosure, the terminal determines the receiving PDSCH set according to the priority of the candidate PDSCH scheduled by the base station, and the quantity of PDSCHs included in the receiving PDSCH set meets the receiving capability of the terminal, so that the terminal can receive multiple data services simultaneously, and may select the type and quantity of the finally received PDSCH according to the service priority to meet user requirements.

Further, the determining, by the terminal, the receiving PDSCH set according to the priority of the candidate PDSCH scheduled by the base station includes one of following:

(1): determining the receiving PDSCH set according to PDSCH with a highest priority in the candidate PDSCH set, where the quantity of PDSCHs to be received in the receiving PDSCH set meets the receiving capability of the terminal;

the method of determining the receiving PDSCH set is applicable to the Capability A and Capability B, that is, in a case that the receiving capability of the terminal is that: in TDM mode, data of at most N PDSCHs is received, it can be selected from the PDSCH with the highest priority until the quantity of selected PDSCHs meets the receiving capability of the terminal; in a case that the receiving capability of the terminal is that: in FDM mode, data of at most N PDSCHs is received, it can be selected from the PDSCH with the highest priority until the quantity of selected PDSCHs meets the receiving capability of the terminal.

It should be noted that, in this embodiment, when determining the PDSCH to be received in the receiving PDSCH set, the terminal selects the PDSCH with the highest priority in the current candidate PDSCH set each time. For example: the candidate PDSCH set includes 6 PDSCHs, and the terminal selects the PDSCH with the highest priority among the 6 PDSCHs as the PDSCH to be received for the first time, then the candidate PDSCH set at this time also includes 5 PDSCHs, in the second selection, the terminal selects the PDSCH with the highest priority among the five PDSCHs as the PDSCH to be received, and selects cyclically until the quantity of PDSCHs to be received meets the receiving capability of the terminal.

(2): excluding PDSCH with a lowest priority in the candidate PDSCH set, and determining the candidate PDSCH set subjected to the exclusion process as the receiving PDSCH set, where the quantity of PDSCHs to be received in the receiving PDSCH set meets the receiving capability of the terminal.

The method of determining the receiving PDSCH set is applicable to the Capability A and Capability B, that is, in a case that the receiving capability of the terminal is: in TDM mode, data of at most N PDSCHs is received, the PDSCH with the lowest priority shall be excluded in turn, until the quantity of PDSCHs in the candidate PDSCH set subjected to the exclusion process meets the receiving capability of the terminal; in a case that the receiving capability of the terminal is: in FDM mode, data of at most N PDSCHs is received, the PDSCH with the lowest priority shall be excluded in turn, until the quantity of PDSCHs in the candidate PDSCH set subjected to the exclusion process meets the receiving capability of the terminal.

It should be noted that, in this embodiment, when determining the PDSCH to be received in the receiving PDSCH set, the terminal selects the PDSCH with the lowest priority in the current candidate PDSCH set for exclusion each time. For example: the candidate PDSCH set includes 6 PDSCHs, and the terminal selects the PDSCH with the lowest priority among the 6 PDSCHs for the first time to exclude, then the candidate PDSCH set also includes 5 PDSCHs at this time, during the second selection, the terminal selects the PDSCH with the lowest priority among the five PDSCHs to exclude, and selects cyclically until the quantity of PDSCHs to be received meets the receiving capability of the terminal.

In this embodiment, the terminal receives the data on the PDSCHs in the TDM mode, or receives the data on the PDSCHs in the FDM mode, may start to select from the PDSCH with the highest priority in the candidate PDSCH set, until the quantity of selected PDSCHs meets the receiving capability of the terminal, or may start to exclude the PDSCH with the lowest priority in the candidate PDSCH set, until the quantity of PDSCHs in the candidate PDSCH set after PDSCH is excluded meets the receiving capability of the terminal.

The specific embodiments below respectively illustrate the specific method of determining the receiving PDSCH set according to PDSCH with the highest priority in the candidate PDSCH set, and the specific method of determining the receiving PDSCH set according to PDSCH with the lowest priority in the candidate PDSCH set.

Specifically, the determining the receiving PDSCH set according to the PDSCH with the highest priority in the candidate PDSCH set, may include:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

In this embodiment, the UE selects the PDSCH with a higher priority from the candidate PDSCH set into the receiving PDSCH set, in a case that the total quantity of PDSCHs to be received in the receiving PDSCH set reaches the maximum receiving capability of the terminal, the operation of selecting the PDSCH to be received is stopped, and the PDSCH to be received in the receiving PDSCH set obtained at this time is the PDSCH of data to be received by the terminal.

In a case that the total quantity of PDSCHs to be received in the receiving PDSCH set does not reach the maximum receiving capability of the terminal, all PDSCHs in the candidate PDSCH set that overlap with the PDSCHs in the receiving PDSCH set in a time domain or frequency domain are excluded. After deleting the PDSCHs in the candidate PDSCH set that overlap with all the PDSCHs in the receiving PDSCH set in the time domain or frequency domain, the first candidate set is obtained, in a case that the first candidate set is an empty set, the operation of selecting the PDSCH to be received is stopped, and the PDSCH to be received in the receiving PDSCH set obtained at this time is the PDSCH of the data to be received by the terminal.

In a case that the first candidate set is not an empty set, then the first candidate set is used as the candidate PDSCH set, the step 1 is performed repeatedly, and the PDSCH with the highest priority is selected from the first candidate set into the receiving PDSCH set, the above operations are performed cyclically until the quantity of PDSCHs in the receiving PDSCH set meets the capability of the UE or the candidate PDSCH set is empty. The UE selects the data on the PDSCH in the receiving PDSCH set for reception.

It should be noted that, in this embodiment, in a case that the terminal receives data in TDM mode, the second PDSCH in the step 2 is a PDSCH overlapped in a time domain with all PDSCHs in the receiving PDSCH set; in a case that the terminal receives data in FDM mode, the second PDSCH in step 2 is a PDSCH overlapped in frequency domain with all PDSCHs in the receiving PDSCH set.

Figure 2:
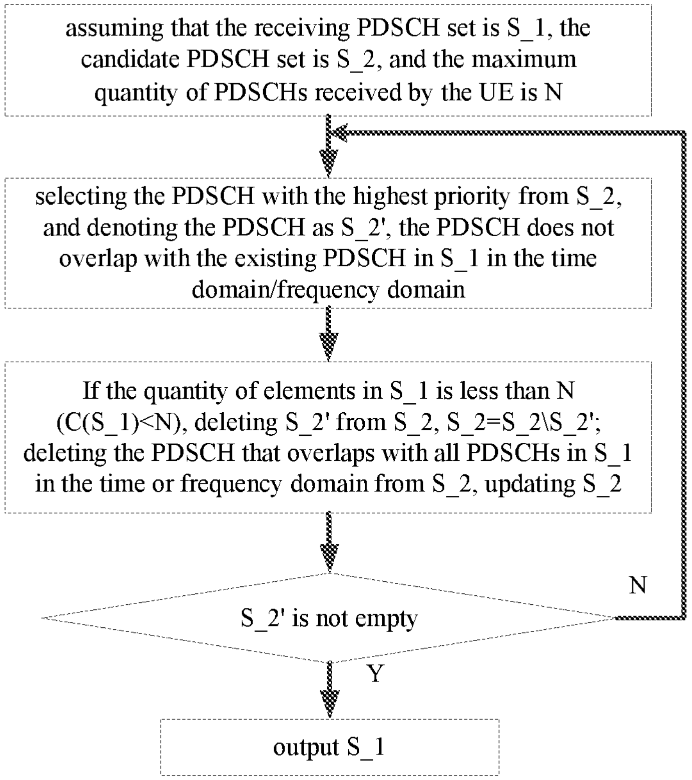
FIG. 2 shows a second flowchart of the method for receiving PDSCH according to an embodiment of the present disclosure.

As an optional embodiment, the specific implementation process of this embodiment is described by taking the terminal receiving capability of TDM or FDM mode, and the terminal receiving at most N PDSCHs simultaneously as an example. In this embodiment, the terminal selects a PDSCH with a higher priority from the candidate PDSCH set for reception until the receiving capability of the UE is reached. In this embodiment, the type of the PDSCH may not be distinguished, for example, whether the PDSCH is a unicast PDSCH or an MBS PDSCH is not distinguished. And the priorities of different PDSCHs have been known, the specific steps are shown in FIG. 2:

1): determining the parameter set and UE receiving capability.

assuming that the receiving PDSCH set is S_1, the candidate PDSCH set is S_2, and the maximum quantity of PDSCHs received by the UE is N.

2): selecting PDSCH with the highest priority.

selecting the PDSCH with the highest priority from S_2, and denoting the PDSCH with the highest priority as S_2', where the PDSCH does not overlap with the existing PDSCH in S_1 in the time domain or frequency domain;

putting S_2' into S_1, then $S\_1=S\_1 \cap S\_2'$; "U" means the union of S_1 and S_2'.

3): determining whether the maximum receiving capability of the UE is met.

If $C(S\_1)<N$, deleting S_2' from S_2, $S\_2=S\_2\backslash S\_2'$, "\" means delete; and deleting the PDSCH that overlaps with all PDSCHs in S_1 in the time domain or frequency domain from S_2, and updating S_2;

If $C(S\_2)\neq 0$, returning to step 2); otherwise, executing step 4).

If $C(S\_1)=N$, executing step 4).

where, C( ) represents the size of the set, that is, quantity of elements included in the set. The size of the empty set is 0.

4): selecting, by the UE, to receive the PDSCH in the S_1 set.

In this embodiment, the receiving PDSCH set is determined according to the PDSCH with the highest priority in the candidate PDSCH set, the quantity of PDSCHs to be received in the receiving PDSCH set meets the receiving capability of the terminal, the terminal can receive multiple data services simultaneously, and can select the quantity and type of PDSCHs finally received according to the service priority, which can meet the user requirements under the 5G network.

The above is the specific implementation process of determining the receiving PDSCH set according to the PDSCH with the highest priority in the candidate PDSCH set. The following describes the implementation process of determining the receiving PDSCH set according to PDSCH with the lowest priority in the candidate PDSCH set.

Specially, the excluding the PDSCH with the lowest priority in the candidate PDSCH set, and the determining the candidate PDSCH set subjected to the exclusion process as the receiving PDSCH set, may include:

step 1: deleting a second PDSCH with a lowest priority in the candidate PDSCH set to obtain a second candidate set, where quantity of PDSCHs in the second candidate set meets the receiving capability of the terminal, determining, in a case that there is no PDSCH overlapped in a time domain or frequency domain in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;

step 2: using the second candidate set as the candidate PDSCH set, and repeating the step 1.

In this embodiment, the UE excludes the PDSCHs with the low priority in the candidate PDSCH set, and then determines whether there is an overlapping between the PDSCHs in the second candidate set obtained after being updated, in a case that the quantity of PDSCHs in the second candidate set meets the receiving capability of the terminal, and there is no PDSCH overlapped in the time domain or frequency domain in the second candidate set, the second candidate set is determined as the receiving PDSCH set.

In a case that there is overlap between any two PDSCHs, the UE continues to exclude the PDSCHs with the low priority in the second candidate set, and performs the above-mentioned operations circularly until there is no that the remaining PDSCHs of the candidate PDSCH set overlap with each other. The UE selects the data on the PDSCH in the candidate PDSCH set for reception.

It should be noted that, in this embodiment, in a case that the terminal receives data in TDM mode, the "overlapped PDSCH" in the step 1 refers to: the PDSCH overlapped in a time domain; in a case that the terminal receives data in FDM mode, the "overlapped PDSCH" in the step 1 refers to: PDSCH overlapped in a frequency domain.

Figure 3:
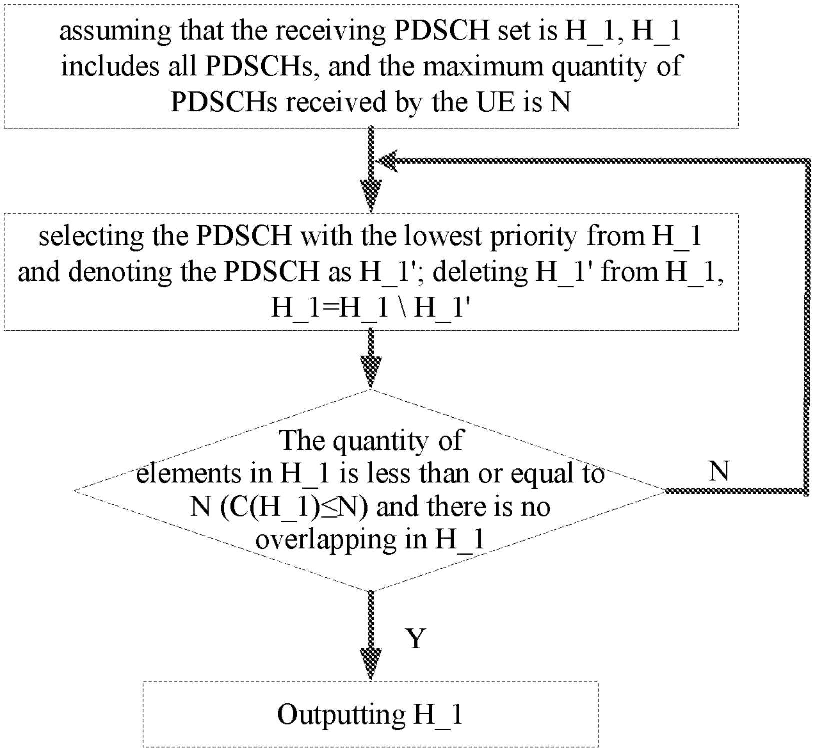
FIG. 3 shows a third flowchart of the method for receiving PDSCH according to an embodiment of the present disclosure.

As an optional embodiment, the specific implementation process of this embodiment is described by taking the UE receiving capability of TDM or FDM mode, and the UE receiving at most N PDSCHs simultaneously as an example. In this embodiment, the UE sequentially excludes PDSCHs with the low priority from the candidate PDSCH set until the receiving capability of the UE is reached; then determines whether there is an overlapping in the candidate PDSCH set subjected to the exclusion process, and in a case that there is an overlapping, PDSCHs with the low priority continues to be excluded until there is no overlapping in the remaining candidate PDSCH sets. In this scheme, the service types of PDSCH are not distinguished, and the priority of PDSCH has been known, the specific steps are shown in FIG. 3:

a): determining the parameter set and UE receiving capability.

assuming that the receiving PDSCH set is H_1, H_1 includes all PDSCHs, and the maximum quantity of PDSCHs received by the UE is N.

b): selecting the PDSCH with the lowest priority.

selecting the PDSCH with the lowest priority from H_1 to denote the PDSCH with the lowest priority as H_1'; deleting H_1' from H_1, $H\_1=H\_1\backslash H\_1'$, "\" means delete;

c): determining whether the receiving PDSCH set has an overlapping and whether the UE receiving capability is met.

In a case that there is an overlapping in H_1 or the UE receiving capability is not met (that is, the quantity of PDSCHs in H_1 is greater than N), returning to execute step b), and continuing to remove the PDSCH with the lowest priority in H_1 until there is no overlapping or the receiving capability of the UE is met, executing step d).

d): selecting, by the UE, to receive the PDSCH in the H_1 set.

In this embodiment, the PDSCH with the lowest priority in the candidate PDSCH set is excluded, and the receiving PDSCH set is determined, the quantity of PDSCHs to be received in the receiving PDSCH set meets the receiving capability of the terminal, the terminal can receive multiple data services simultaneously, and can select the quantity and types of PDSCHs finally received according to the service priority, which can meet the user requirements under the 5G network.

It should be noted that, according to the above-mentioned steps 1)-4) and steps a)~d), after the receiving capability of the terminal is determined, the terminal may select a receiving PDSCH in one of the following schemes:

Scheme 1: receiving set S_1;

Scheme 2: receiving set H_1;

Scheme 3: selecting receiving S_1 or H_1 according to the judgment standard.

It is assumed that the receiving PDSCH set S_1={PDSCHx, PDSCHy, PDSCHz} obtained by scheme 1, and the receiving set H_1={PDSCHa, PDSCHb} obtained by scheme 2.

The judgment standard can be as follows:

Criterion 1: selecting a scheme with a larger receiving PDSCH set. The size of the receiving PDSCH set in Scheme 1 is 3, and the size of the receiving PDSCH set in Scheme 2 is 2, then the UE selects the receiving S_1.

Criterion 2: selecting a scheme with a largest sum of priority weights. Assuming that the set is {PDSCHx, PDSCHy, PDSCHz}, the corresponding priority weights are {6, 3, 1}, and the weight sum is 10; {PDSCHa, PDSCHb} corresponds to the priority weights {6, 5}, and the weight sum is 11, then UE selects the receiving H_1.

Optionally, the method further includes: determining, in a case that two PDSCHs meet a first condition, that the two PDSCHs do not overlap in a time domain, where the first condition is: a start time of one of the two PDSCHs is later than an end time of the other PDSCH.

This embodiment is a method for determining that two PDSCHs do not overlap in the time domain. In a case that the start time of any one PDSCH is later than the end time of the other PDSCH, the two PDSCHs do not overlap in the time domain.

As an optional embodiment, relevant information of a time domain resource assignment table (Time Domain Resource Assignment table, TDRA table) may be used to determine whether there is an overlapping between two PDSCHs in a time slot. According to the TDRA table in the downlink control information (Downlink Control Information, DCI), the start symbol time slot position index number S of PDSCH, and the length L of continuous symbols allocated by PDSCH can be obtained. The end symbol time slot position index number m(m=S+L−1) of PDSCH can be obtained by calculating according to these two parameters.

In a case that the start symbol index number of any one PDSCH is greater than the end symbol index number of the other PDSCH, it means that the time domains do not overlap.

Figure 4:
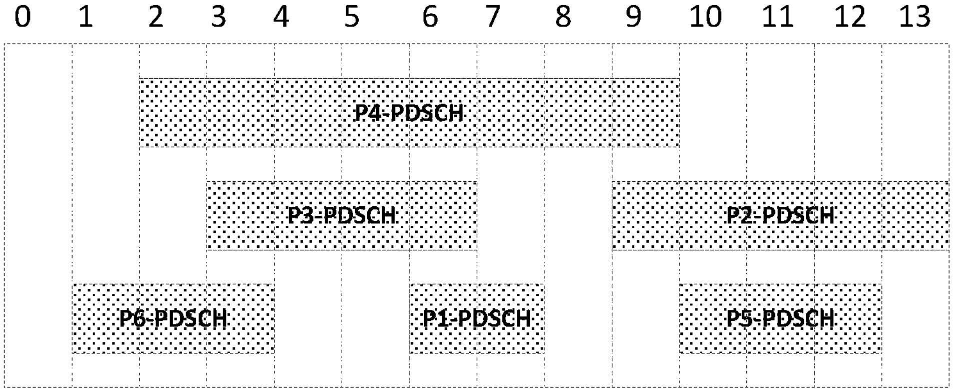
FIG. 4 shows a schematic view of a positional relationship between multiple PDSCHs in an embodiment of the present disclosure.

6 PDSCHs are taken as an example, the relationship between the 6 PDSCHs is shown in FIG. 4, where it is assumed that the priorities from large to small are: P1-PDSCH>P2-PDSCH>P3-PDSCH>P4-PDSCH>P5-PDSCH>P6-PDSCH. The TDRA table corresponding to respective PDSCHs in FIG. 4 is shown in Table 1. In Table 1, "S" represents the start symbol time slot position index number of PDSCH, "L" represents the length of continuous symbols allocated by PDSCH, and "m" represents the end symbol time slot position index number of PDSCH obtained by calculating according to "S" and "L".

TABLE 1

| S | L | m | |
|---|---|---|---|
| 1 | 3 | 3 | P6-PDSCH |
| 2 | 8 | 9 | P4-PDSCH |
| 3 | 4 | 6 | P3-PDSCH |
| 6 | 2 | 7 | P1-PDSCH |
| 9 | 5 | 13 | P2-PDSCH |
| 10 | 3 | 12 | P5-PDSCH |

For example: determining whether P1-PDSCH and P2-PDSCH overlap in a time domain:

the start symbol index number of P1-PDSCH is 6, and the end symbol index number of P1-PDSCH is 7. The start symbol index number of P2-PDSCH is 9, and the end symbol index number of P2-PDSCH is 13. Then the start symbol index number of P2-PDSCH is greater than the end symbol index number of P1-PDSCH (9>7), which meets the non-overlapping condition, then P1-PDSCH and P2-PDSCH do not overlap in the time domain.

Determining whether P1-PDSCH and P3-PDSCH overlap in the time domain:

The start symbol index number of P1-PDSCH is 6, and the end symbol index number of P1-PDSCH is 7. The start symbol index number of P3-PDSCH is 3, and the end symbol index number of P3-PDSCH is 6. Then the start symbol index number of P1-PDSCH is less than the end symbol index number of P3-PDSCH (6=6), the start symbol index number of P3-PDSCH is less than the end symbol index number of P1-PDSCH (3<7), and the condition is not met, then P1-PDSCH overlaps with P3-PDSCH in the time domain. In the same way, it can be determined whether any other two PDSCHs overlap in the time domain, which will not be repeated here.

Optionally, the method further includes: determining, in a case that the two PDSCHs meet a second condition, that the two PDSCHs do not overlap in a frequency domain, where the second condition is: a start resource block RB index number of one of the two PDSCHs is greater than an end RB index number of the other PDSCH.

This embodiment is a method for determining that two PDSCHs do not overlap in the frequency domain, in a case that the start RB index number of any one PDSCH is greater than the end RB index number of the other PDSCH, the two PDSCHs do not overlap in the frequency domain.

In a case that the frequency domains do not overlap is determined, the parameters in the frequency domain resource assignment field (Frequency domain resource assignment field) in DCI need to be used, such as start RB index number (RBstart) and configured continuous RB quantity (LRBs). The start symbol index number of any one PDSCH is greater than the end symbol index number of the other PDSCH and the two PDSCHs do not overlap in the frequency domain. The specific method is similar to the method for determining that two PDSCHs do not overlap in the time domain, and will not be repeated here.

It should be noted that a candidate PDSCH may be a PDSCH scheduled by the base station before receiving a target time threshold of a time slot. Optionally, the method further includes: receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

Figure 5:
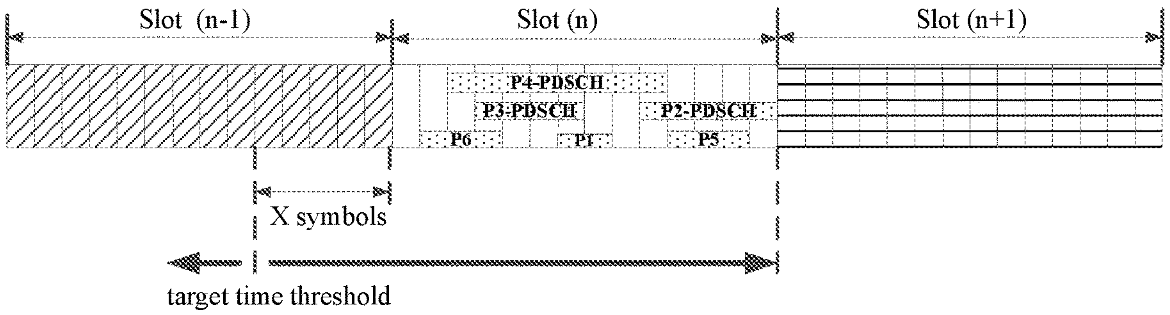
FIG. 5 shows a schematic view of a setting position of a target time threshold in an embodiment of the present disclosure.

In this embodiment, due to the dynamic PDSCH scheduling, some PDSCHs are scheduled later, and the UE cannot determine whether there are other scheduled PDSCHs that need to be processed together subsequently when processing the PDSCH which start position reaches earlier. Therefore, the target time threshold can be set before receiving time slot, and the PDSCH scheduled before the target time threshold is preferentially processed. The target time threshold may be set at the first X symbols (symbols) of the current time slot (n), as shown in FIG. 5.

The specific steps may be as follows:

One: for the PDSCH scheduled before the target time threshold:

the PDSCH scheduled before the target time threshold can be selected by using the schemes proposed in the embodiments of the present disclosure. That is, the PDSCH scheduled after the target time threshold has a lower priority and does not participate in the first selection of the PDSCH.

Two: For the PDSCH scheduled after the target time threshold:

in a case that the receiving capability of the UE is not met after the selection for the PDSCH scheduled before the target time threshold in step 1 is completed, the PDSCH scheduled after the target time threshold is reached shall be selected and received without overlap according to the arrival time sequence. In a case that the receiving capability of UE is met, the PDSCH scheduled after the target time threshold is reached will be no longer received.

In this embodiment, the target time threshold is set before receiving time slot, and the PDSCH scheduled before the target time threshold is used as the candidate PDSCH, and the terminal determines the receiving PDSCH set according to the priority of the candidate PDSCH; for the PDSCH scheduled after the target time threshold, the terminal selects and receives the PDSCH scheduled after the target time threshold according to the time sequence of the PDSCH. The UE may receive multiple data services simultaneously, and may select the quantity and type of PDSCHs finally received according to the service priority, which can meet the user requirements under the 5G network.

The implementation process of the terminal receiving PDSCH in the TDM mode and the implementation process of receiving PDSCH in the FDM mode are respectively described below through specific examples. 6 PDSCHs are taken as an example, the relationship between the 6 PDSCHs is shown in FIG. 4, where it is assumed that the priorities from large to small are: P1-PDSCH>P2-PDSCH>P3-PDSCH>P4-PDSCH>P5-PDSCH>P6-PDSCH.

Example 1: The terminal receives at most 3 PDSCHs simultaneously in TDM mode, and the terminal determines the receiving PDSCH set according to the PDSCH with the highest priority in the candidate PDSCH set, which specifically includes the following steps:

Step 1 (Step1): determining the parameter set and UE receiving capability.

setting S_1 be empty;

setting S_2={P1-PDSCH, P2-PDSCH, P3-PDSCH, P4-PDSCH, P5-PDSCH, P6-PDSCH};

the UE receives at most 3 PDSCHs in TDM mode.

Step 2 (Step2): selecting the PDSCH with the highest priority.

S_2'={P1-PDSCH};

putting P1-PDSCH into S_1, S_1=S_1 ∩S_2'={P1-PDSCH}; excluding P1-PDSCH from S_2, S_2=S_2\S_2'={P2-PDSCH, P3-PDSCH, P4-PDSCH P5-PDSCH, P6-PDSCH}.

Step 3 (Step3): determining whether the receiving capability of the UE is met.

C(S_1)=1<3, and C(S_2)=5, deleting the PDSCH overlapped with all PDSCHs in S_1 in the time domain from S_2, updating S_2, S_2={P2-PDSCH,P5-PDSCH,P6-PDSCH}; returning to Step2: S_2'={P2-PDSCH};

S_1={P1-PDSCH, P2-PDSCH}, S_2={P5-PDSCH, P6-PDSCH}.

C(S_1)=2<3, and C(S_2)=2, deleting the PDSCH overlapped with all PDSCHs in S_1 in the time domain from S_2, updating S_2, S_2={P6-PDSCH}; returning to Step2:S_2'={P6-PDSCH};

S_1={P1-PDSCH, P2-PDSCH, P6-PDSCH}, S_2=0;

C(S_1)=3=3, executing step 4 (Step4).

Step4: selecting, by the UE, PDSCHs in the receiving S_1 set.

The UE receives S_1={P1-PDSCH, P2-PDSCH, P6-PDSCH}.

Example 2: the terminal receives at most 3 PDSCHs simultaneously in FDM mode, and the terminal determines the receiving PDSCH set according to the PDSCH with the highest priority in the candidate PDSCH set, which specifically includes the following steps:

Step1: determining the parameter set and UE receiving capability.

setting S_1 be empty;

setting S_2={P1-PDSCH, P2-PDSCH, P3-PDSCH, P4-PDSCH, P5-PDSCH, P6-PDSCH};

UE receives at most 3 PDSCHs in FDM mode.

Step2: selecting the PDSCH with the highest priority.

S_2'={P1-PDSCH};

putting P1-PDSCH into S_1, S_1=S_1 ∩S_2'={P1-PDSCH}; deleting P1-PDSCH from S_2, S_2=S_2\S_2'={P2-PDSCH, P3-PDSCH, P4-PDSCH P5-PDSCH, P6-PDSCH}.

Step3: determining whether the receiving capability of the UE is met.

C(S_1)=1<3, and C(S_2)=5, deleting the PDSCH overlapped with all PDSCHs (i.e. P1-PDSCH) in S_1 in the frequency domain from S_2, updating S_2, S_2={P2-PDSCH, P3-PDSCH, P4-PDSCH}; returning Step2: S_2'={P2-PDSCH}, S_1={P1-PDSCH, P2-PDSCH}, S_2={P3-PDSCH, P4-PDSCH}.

C(S_1)=2<3, and C(S_2)=2, deleting the PDSCH overlapped with all PDSCHs (i.e. P1-PDSCH and P2-PDSCH) in S_1 in the frequency domain from S_2, updating S_2, S_2={P4-PDSCH}.

Returning to Step 2: S_2'={P4-PDSCH}, S_1={P1-PDSCH, P2-PDSCH, P4-PDSCH}, S_2=0.

C(S_1)=3=3, executing Step4.

Step4: selecting, by the UE, PDSCHs in the receiving S_1 set.

The UE receives S_1={P1-PDSCH, P2-PDSCH, P4-PDSCH}.

Example 3: the terminal receives at most 3 PDSCHs simultaneously in TDM mode, and the terminal excludes the PDSCH with the lowest priority in the candidate PDSCH set, and determines the candidate PDSCH set subjected to the exclusion process as the receiving PDSCH set, which specifically includes the following steps:

Step1: determining the parameter set and UE receiving capability.

H_1={P1-PDSCH, P2-PDSCH, P3-PDSCH, P4-PDSCH, P5-PDSCH, P6-PDSCH};

the UE receives at most 3 PDSCHs in TDM mode.

Step2: selecting the PDSCH with the lowest priority.

H_1'={P6-PDSCH};

deleting P6-PDSCH from H_1, H_1=H_1\H_1'={P1-PDSCH, P2-PDSCH, P3-PDSCH, P4-PDSCH, P5-PDSCH};

Step3: determining whether there is an overlapping in H_1 and whether the receiving capability of the UE is met.

P2-PDSCH and P5-PDSCH overlap in the time domain, then executing Step2: H_1'={P5-PDSCH}, deleting P5-PDSCH from H_1;

H_1=H_1\H_1'={P1-PDSCH, P2-PDSC, P3-PDSCH, P4-PDSCH};

continuing to determine whether there is an overlapped in H_1, in a case that there is an overlapping, continuing to exclude the PDSCH with low priority: H_1'=P4-PDSCH, deleting P4-PDSCH from H_1, H_1=H_1\H_1'={P1-PDSCH, P2-PDSH, P3-PDSCH}.

P2-PDSCH and P3-PDSCH still have an overlapping, continuing to exclude H_1'=P3-PDSCH, H_1=H_1\H_1'={P1-PDSCH,P2-PDSCH}, until there is no overlapping, and at this time C(Hi)=2<3, executing Step4.

Step4: selecting, by the UE, PDSCHs in the receiving H_1 set, H_1={P1-PDSCH, P2-PDSCH}.

Example 4: the terminal receives at most 3 PDSCHs simultaneously in FDM mode, and the terminal excludes the PDSCH with the lowest priority in the candidate PDSCH set, and determines the candidate PDSCH set subjected to the exclusion process as the receiving PDSCH set, which specifically includes the following steps:

Step1: determining the parameter set and UE receiving capability.

H_1={P1-PDSCH, P2-PDSCH, P3-PDSCH, P4-PDSCH, P5-PDSCH, P6-PDSCH};

UE receives at most 3 PDSCHs in FDM mode.

Step2: selecting the PDSCH with the lowest priority.

H_1'=P6-PDSCH;

deleting P6-PDSCH from H_1 H_1=H_1\H_1'={P1-PDSCH, P2-PDSCH, P3-PDSCH, P4-PDSCH, P5-PDSCH}.

Step3: determining whether there is an overlapping in H_1 and whether the receiving capability of the UE is met.

P2-PDSCH and P3-PDSCH overlap in time domain. Then H_1'={P5-PDSCH}, H_1=H_1\H_1'={P1-PDSCH, P2-PDSCH, P3-PDSCH, P4-PDSCH}; continuing to determine whether there is an overlapping in H_1, if so, continuing to exclude the PDSCH with low priority: H_1'=P4-PDSCH, H_1=H_1\H_1'={P1-PDSCH, P2-PDSH, P3-PDSCH}.

P2-PDSCH and P3-PDSCH still have an overlapping, continuing to exclude H_1'=P3-PDSCH, H_1=H_1\H_1'={P1-PDSCH, P2-PDSCH}, there is no overlapping at this time and at this time C(Hi)=2<3, executing Step4.

Step4: selecting, by the UE, PDSCHs in the receiving H_1 set, H_1={P1-PDSCH, P2-PDSCH}.

According to the above-mentioned example 1, example 2, example 3, and example 4, the receiving PDSCH set obtained is shown in Table 2, where scheme 1 refers to: determining the receiving PDSCH set according to the PDSCH with the highest priority in the candidate PDSCH set; scheme 2 refers to: excluding PDSCH with a lowest priority in the candidate PDSCH set, and determining the candidate PDSCH set subjected to the exclusion process as the receiving PDSCH set.

TABLE 2

| | scheme 1 | scheme 2 |
|---|---|---|
| TDM | S_1 = {P1-PDSCH, P2-PDSCH, P6-PDSCH} | H_1 = {P1-PDSCH, P2-PDSCH} |
| FDM | S_1 = {P1-PDSCH, P2-PDSCH, P4-PDSCH} | H_1 = {P1-PDSCH, P2-PDSCH} |

According to the results of Scheme 1 and Scheme 2 in Table 2, when the UE receives multiple PDSCHs in TDM or FDM mode, if the terminal selects a scheme with a large receiving PDSCH set according to Criterion 1, then the UE selects receiving S_1; if the terminal selects a scheme with a large sum of priority weights according to Criterion 2, the UE selects receiving S_1.

In the embodiment of the present disclosure, the terminal determines the receiving PDSCH set according to the priority of the candidate PDSCH scheduled by the base station, and the quantity of PDSCHs included in the receiving PDSCH set meets the receiving capability of the terminal, so that the terminal can receive multiple data services simultaneously, and can select the type and quantity of the PDSCH received finally according to the service priority to meet user requirements.

The technical solutions provided by the embodiments of the present disclosure can be applied to various systems, especially 5G systems. For example, the applicable system may be global system of mobile communication (GSM) system, code division multiple access (code division multiple access, CDMA) system, wideband code division multiple access (Wideband Code Division Multiple Access, WCDMA) general packet radio service (general packet radio service, GPRS) system, long term evolution (long term evolution, LTE) system, long term evolution (Long Term Evolution, LTE) frequency division duplex (frequency division duplex, FDD) system, LTE time division duplex (time division duplex, TDD) system, long term evolution advanced (long term evolution advanced, LTE-A) system, universal mobile telecommunication system (universal mobile telecommunication system, UMTS), worldwide interoperability for microwave access (worldwide interoperability for microwave access, WiMAX) system, 5G new radio (New Radio, NR) system, etc. These various systems include terminal devices and network devices. The system may also include a core network part, such as an evolved packet system (Evolved Packet System, EPS), a 5G system (5GS), and the like.

The above embodiments introduce the method for receiving PDSCH of the present disclosure, and the corresponding apparatus will be further described with reference to the drawings in the embodiment below.

Figure 6:
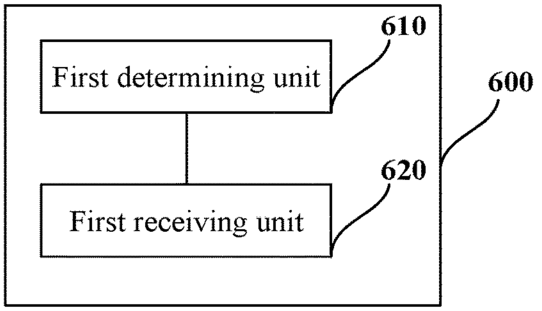
FIG. 6 shows a first schematic structural view of an apparatus for receiving PDSCH according to an embodiment of the present disclosure.

Specifically, as shown in FIG. 6, an embodiment of the present disclosure provides an apparatus 600 for receiving PDSCH, which includes:

a first determining unit 610, configured to determine a receiving PDSCH set according to a priority of a candidate physical downlink shared channel PDSCH scheduled by a base station, where quantity of PDSCHs to be received in the receiving PDSCH set meets receiving capability of the terminal;

a first receiving unit 620, configured to receive data on the PDSCH to be received in the receiving PDSCH set.

Optionally, the first determining unit 610 specifically includes one of the following:

a first determining subunit, configured to determine the receiving PDSCH set according to PDSCH with a highest priority in the candidate PDSCH set, where the quantity of PDSCHs to be received in the receiving PDSCH set meets the receiving capability of the terminal;

a second determining subunit, configured to exclude PDSCH with a lowest priority in the candidate PDSCH set, and determine the candidate PDSCH set subjected to the exclusion process as the receiving PDSCH set, where the quantity of PDSCHs to be received in the receiving PDSCH set meets the receiving capability of the terminal.

Optionally, the first determining subunit is specifically configured to implement:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

Optionally, the second determining subunit is specifically configured to implement:

step 1: deleting a second PDSCH with a lowest priority in the candidate PDSCH set to obtain a second candidate set, where quantity of PDSCHs in the second candidate set meets the receiving capability of the terminal, determining, in a case that there is no PDSCH overlapped in a time domain or a frequency domain in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;

step 2: using the second candidate set as the candidate PDSCH set, and repeating the step 1.

Optionally, the apparatus further includes:

a second determining unit, configured to determine, in a case that two PDSCHs meet a first condition, that the two PDSCHs do not overlap in the time domain, where the first condition is: a start time of one of the two PDSCHs is later than an end time of the other PDSCH.

Optionally, the apparatus further includes:

a third determining unit, configured to determine, in a case that the two PDSCHs meet a second condition, that the two PDSCHs do not overlap in the frequency domain, where the second condition is: a start resource block RB index number of one of the two PDSCHs is greater than an end RB index number of the other PDSCH.

Optionally, a candidate PDSCH is a PDSCH scheduled by the base station before receiving a target time threshold of a time slot.

Optionally, the apparatus further includes:

a second receiving unit, configured to receive, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

It should be noted that the embodiment of the apparatus corresponds to the embodiment of the method for receiving PDSCH above, and all the implementation methods in the above-mentioned method embodiment are applicable to the embodiment of the apparatus, and can also achieve the same technical effect. Since the method embodiment and the apparatus embodiment are based on the same idea, and the principles of solving the problem are similar, which may be referred with each other, and the repetitive parts will not be repeated.

It should be noted that the division of the units in the embodiment of the present disclosure is schematic, and is only a logical function division, and there may be another division manner in actual implementation. In addition, each functional unit in each embodiment of the present disclosure may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution or the part that contributes to the related technology, or all or part of the technical solution in the present disclosure may be embodied in the form of software product, and the computer software product are stored in a storage medium, several instructions are included to enable a computer device (which may be a personal computer, a server, or a network device, etc.) or a processor (processor) to execute all or part of the steps of the methods described in various embodiments of the present disclosure. The aforementioned storage media include: U disk, mobile hard disk, read-only memory (Read-Only Memory, ROM), random access memory (Random Access Memory, RAM), magnetic disk or optical disk and other media that can store program codes.

Figure 7:
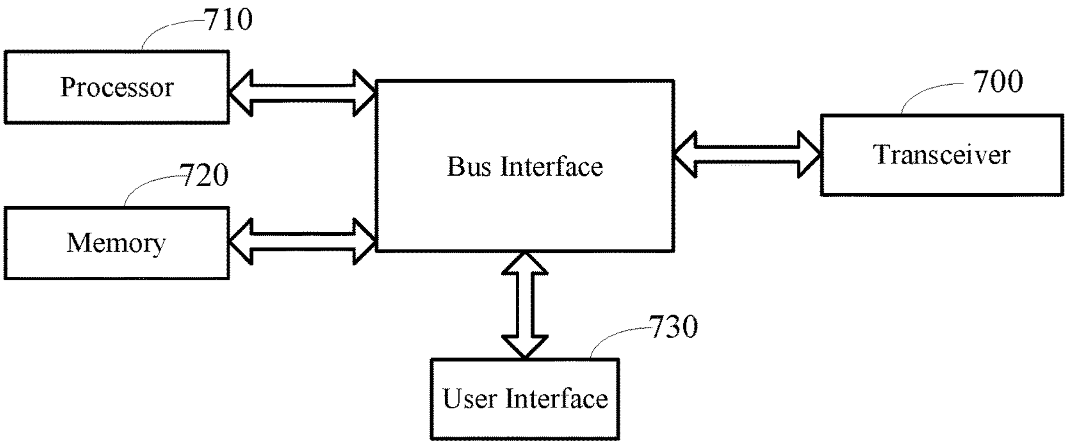
FIG. 7 shows a second schematic structural view of the apparatus for receiving PDSCH according to an embodiment of the present disclosure.

As shown in FIG. 7, an embodiment of the present disclosure also provides an apparatus for receiving PDSCH, including: a memory 720, a transceiver 700, and a processor 710, where the memory 720 is configured to store computer program; the transceiver 700 is configured to send and receive data under the control of the processor 710;

the processor 710 is configured to read the computer program in the memory 720 and perform the following operations of:

determining a receiving PDSCH set according to a priority of a candidate physical downlink shared channel PDSCH scheduled by a base station, where quantity of PDSCHs to be received in the receiving PDSCH set meets receiving capability of the terminal;

receiving data on the PDSCH to be received in the receiving PDSCH set.

Optionally, the determining, by the terminal, the receiving PDSCH set according to the priority of the candidate PDSCH scheduled by the base station includes one of following:

determining the receiving PDSCH set according to PDSCH with a highest priority in the candidate PDSCH set, where the quantity of PDSCHs to be received in the receiving PDSCH set meets the receiving capability of the terminal;

excluding PDSCH with a lowest priority in the candidate PDSCH set, and determining the candidate PDSCH set subjected to the exclusion process as the receiving PDSCH set, where the quantity of PDSCHs to be received in the receiving PDSCH set meets the receiving capability of the terminal.

Optionally, the determining the receiving PDSCH set according to the PDSCH with the highest priority in the candidate PDSCH set, specially includes:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set including the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, where the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set including the first PDSCH as the receiving PDSCH set.

Optionally, the excluding the PDSCH with the lowest priority in the candidate PDSCH set, and the determining the candidate PDSCH set subjected to the exclusion process as the receiving PDSCH set, specially includes:

step 1: deleting a second PDSCH with a lowest priority in the candidate PDSCH set to obtain a second candidate set, where quantity of PDSCHs in the second candidate set meets the receiving capability of the terminal, determining, in a case that there is no overlapped PDSCH in the second candidate set, the second candidate set as the receiving PDSCH set, where the quantity of PDSCHs in the second candidate set does not meet the receiving capability of the terminal, or performing step 2 in a case that there is an overlapped PDSCH in the second candidate set;

step 2: using the second candidate set as the candidate PDSCH set, and repeating the step 1.

Optionally, when the processor executes the computer program, further configured to implement the following steps of:

determining, in a case that two PDSCHs meet a first condition, that the two PDSCHs do not overlap in a time domain, where the first condition is: a start time of one of the two PDSCHs is later than an end time of the other PDSCH.

Optionally, when the processor executes the computer program, further configured to implement the following steps of:

determining, in a case that the two PDSCHs meet a second condition, that the two PDSCHs do not overlap in a frequency domain, where the second condition is: a start resource block RB index number of one of the two PDSCHs is greater than an end RB index number of the other PDSCH.

Optionally, a candidate PDSCH is a PDSCH scheduled by the base station before receiving a target time threshold of a time slot.

Optionally, the processor is further configured to implement, when executing the computer program, the following steps of:

receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

In FIG. 7, the bus architecture may include any number of interconnected buses and bridges, specifically one or more processors represented by the processor 710 and various circuits of the memory represented by the memory 720 are linked together. The bus architecture can also link together various other circuits such as peripherals, voltage regulators, and power management circuits, etc., which are well known in the art and therefore will not be further described herein. The bus interface provides the interface. Transceiver 700 may be a plurality of elements, including a transmitter and a receiver, which provides units for communicating with various other apparatuses over transmission media, these transmission media include wireless channels, wired channels, fiber optic cables and other transmission media. For different user equipments, the user interface 730 may also be an interface capable of connecting externally and internally to required equipment, and the connected equipment includes but not limited to a keypad, a display, a speaker, a microphone, a joystick, and the like.

The processor 710 is responsible for managing the bus architecture and general processing, and the memory 720 may store data used by the processor 710 when performing operations.

Optionally, the processor 710 may be a central processing unit (Central Processing Unit, CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor can also adopt a multi-core architecture.

The processor is used to execute any one of the methods provided by the embodiments of the present disclosure according to the obtained executable instructions by calling the computer program stored in the memory. The processor and memory may also be arranged physically separately.

It should be noted here that the above-mentioned apparatus provided by the embodiment of the present disclosure can realize all the method steps realized by the above-mentioned embodiment of the method for receiving PDSCH, and can achieve the same technical effect. Parts and beneficial effects in this embodiment that are the same as those in the method embodiment will not be described in detail here.

In addition, specific embodiments of the present disclosure further provide a processor-readable storage medium on which a computer program is stored, where when the program is executed by a processor, the steps of the method for receiving PDSCH as described above are implemented, and can achieve the same technical effect, in order to avoid repetition, no more details here. The readable storage medium may be any available medium or data storage device that can be accessed by the processor, the readable storage medium includes but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to magnetic disk storage, optical storage, etc.) having computer-usable program code embodied therein.

The present disclosure is described with reference to flowcharts and/or block diagrams of methods, devices (systems), and computer program products according to embodiments of the present disclosure. It should be understood that each process and/or block in the flowchart and/or block diagram, and a combination of processes and/or blocks in the flowchart and/or block diagram can be implemented by computer-executable instructions. These computer-executable instructions can be provided to a general-purpose computer, special purpose computer, embedded processor, or processor of other programmable data processing equipment to produce a machine, such that instructions executed by the processor of the computer or other programmable data processing equipment produce an apparatus for realizing the functions specified in one or more processes in a flowchart and/or one or more blocks in a block diagram.

These processor-executable instructions may also be stored in a processor-readable memory capable of directing a computer or other programmable data processing device to operate in a specific manner, such that the instructions stored in the processor-readable memory produce a manufacturing product including instruction apparatus, the instruction apparatus realizes the functions specified in one or more processes of the flowchart and/or one or more blocks of the block diagram.

These processor-executable instructions can also be loaded onto a computer or other programmable data processing device, which causes a series of operational steps to be performed on a computer or other programmable device to produce a computer-implemented process, so that the instructions executed on the computer or other programmable device provide the steps for implementing the functions specified in one or more processes of the flowchart and/or one or more blocks of the block diagram.

It should be noted that it should be understood that the division of the above modules is only a division of logical functions, and may be fully or partially integrated into a physical entity or physically separated during actual implementation. And these modules can all be implemented in the form of calling software through processing elements; or can also be implemented in the form of hardware; some modules can also be implemented in the form of calling software through processing elements, and some modules can be implemented in the form of hardware. For example, the determining module may be a separate processing element, or may be integrated into a certain chip of the above-mentioned apparatus. In addition, it may also be stored in the memory of the above-mentioned apparatus in the form of program code, and a certain processing element of the above-mentioned apparatus may call and execute the functions of the determining modules above. The implementation of other modules is similar. In addition, all or part of these modules can be integrated together, and can also be implemented independently. The processing element mentioned here may be an integrated circuit with signal processing capabilities. In the implementation process, each step of the above-mentioned method or each module above can be completed by an integrated logic circuit of hardware in the processor element or an instruction in the form of software.

For example, each module, unit, subunit or submodule may be one or more integrated circuits configured to implement the above-mentioned method, for example: one or more specific integrated circuits (Application Specific Integrated Circuit, ASIC), or, one or multiple microprocessors (digital signal processor, DSP), or, one or more field programmable gate arrays (Field Programmable Gate Array, FPGA), etc. For another example, when one of the above modules is implemented in the form of a processing element scheduling program code, the processing element may be a general-purpose processor, such as a central processing unit (Central Processing Unit, CPU) or other processors that can call program codes. For another example, these modules can be integrated together and implemented in the form of a system-on-a-chip (SOC).

The terms "first", "second" and the like in the specification and claims of the present disclosure are used to distinguish similar objects, and are not necessarily used to describe a specific order or sequence. It should be understood that the data so used may be interchanged under appropriate circumstances such that the embodiments of the present disclosure described herein are practiced, for example, in sequences other than those illustrated or described herein. Furthermore, the terms "including" and "having", as well as any variations thereof, are intended to cover a non-exclusive inclusion, for example, a process, method, system, product or device including a sequence of steps or elements is not necessarily limited to these steps or elements expressly listed, may include other steps or elements not explicitly listed or inherent to the process, method, product or device. In addition, the use of "and/or" in the specification and claims means at least one of the connected objects, such as A and/or B and/or C, means 7 situations that includes A alone, B alone, C alone, and both A and B exist, both B and C exist, both A and C exist, and A, B, and C all exist. Similarly, the use of "at least one of A and B" in the present specification and claims should be understood as "A alone, B alone, or both A and B exist". The embodiments of the present disclosure have been described above in conjunction with the drawings, but the present disclosure is not limited to the above-mentioned specific embodiments. The above-mentioned specific embodiments are only illustrative and not restrictive. Under the inspiration of the present disclosure, those ordinarily skilled in the art can also make many forms of modification without departing from the purpose of the present disclosure and the scope of protection of the claims, all of which are within the protection of the present disclosure.

What is claimed is:

1. A method for receiving PDSCH, comprising:

determining, by a terminal, a receiving PDSCH set according to a priority of a candidate physical downlink shared channel PDSCH scheduled by a base station, wherein a quantity of PDSCHs to be received in the receiving PDSCH set meets receiving capability of the terminal;

receiving, by the terminal, data on the PDSCH to be received in the receiving PDSCH set;

wherein the determining, by the terminal, the receiving PDSCH set according to the priority of the candidate PDSCH scheduled by the base station comprises:

excluding PDSCH with a lowest priority in the candidate PDSCH set, and determining the candidate PDSCH set subjected to the exclusion process as the receiving PDSCH set, wherein the quantity of PDSCHs to be received in the receiving PDSCH set meets the receiving capability of the terminal;

wherein the excluding the PDSCH with the lowest priority in the candidate PDSCH set, and the determining the candidate PDSCH set subjected to the exclusion process as the receiving PDSCH set, comprises:

step 1: deleting a second PDSCH with a lowest priority in the candidate PDSCH set to obtain a second candidate set, wherein when the quantity of PDSCHs in the second candidate set meets the receiving capability of the terminal, determining, in a case that there is no overlapped PDSCH in the second candidate set, the second candidate set as the receiving PDSCH set; and performing step 2 in a case that the quantity of PDSCHs in the second candidate set does not meet the receiving capability of the terminal, or there is an overlapped PDSCH in the second candidate set;

step 2: using the second candidate set as the candidate PDSCH set, and repeating the step 1;

wherein a candidate PDSCH is a PDSCH scheduled by the base station before receiving a target time threshold of a time slot, and a priority of a PDSCH scheduled before the target time threshold is higher than a priority of a PDSCH scheduled after the target time threshold.

2. The method according to claim 1, wherein the determining, by the terminal, the receiving PDSCH set according to the priority of the candidate PDSCH scheduled by the base station comprises:

determining the receiving PDSCH set according to PDSCH with a highest priority in the candidate PDSCH set, wherein the quantity of PDSCHs to be received in the receiving PDSCH set meets the receiving capability of the terminal.

3. The method according to claim 2, wherein the determining the receiving PDSCH set according to the PDSCH with the highest priority in the candidate PDSCH set, comprises:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set comprising the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, wherein the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set comprising the first PDSCH as the receiving PDSCH set.

4. The method according to claim 3, further comprising:

determining, in a case that two PDSCHs meet a first condition, that the two PDSCHs do not overlap in a time domain, wherein the first condition is: a start time of one of the two PDSCHs is later than an end time of the other PDSCH.

5. The method according to claim 3, further comprising:

determining, in a case that the two PDSCHs meet a second condition, that the two PDSCHs do not overlap in a frequency domain, wherein the second condition is: a start resource block RB index number of one of the two PDSCHs is greater than an end RB index number of the other PDSCH.

6. The method according to claim 1, further comprising:

receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

7. The method according to claim 1, further comprising:

determining, in a case that two PDSCHs meet a first condition, that the two PDSCHs do not overlap in a time domain, wherein the first condition is: a start time of one of the two PDSCHs is later than an end time of the other PDSCH.

8. The method according to claim 1, further comprising:

determining, in a case that the two PDSCHs meet a second condition, that the two PDSCHs do not overlap in a frequency domain, wherein the second condition is: a start resource block RB index number of one of the two PDSCHs is greater than an end RB index number of the other PDSCH.

9. An apparatus for receiving PDSCH, comprising: a transceiver, a memory, a processor, and computer program stored in the memory and operable on the processor, wherein the processor implements, when executing the computer program, the following steps of:

determining a receiving PDSCH set according to a priority of a candidate physical downlink shared channel PDSCH scheduled by a base station, wherein quantity of PDSCHs to be received in the receiving PDSCH set meets receiving capability of the terminal;

receiving data on the PDSCH to be received in the receiving PDSCH set;

wherein the determining the receiving PDSCH set according to the priority of the candidate PDSCH scheduled by the base station comprises:

excluding PDSCH with a lowest priority in the candidate PDSCH set, and determining the candidate PDSCH set subjected to the exclusion process as the receiving PDSCH set, wherein the quantity of PDSCHs to be received in the receiving PDSCH set meets the receiving capability of the terminal;

wherein the excluding the PDSCH with the lowest priority in the candidate PDSCH set, and the determining the candidate PDSCH set subjected to the exclusion process as the receiving PDSCH set, comprises:

step 1: deleting a second PDSCH with a lowest priority in the candidate PDSCH set to obtain a second candidate set, wherein when the quantity of PDSCHs in the second candidate set meets the receiving capability of the terminal, determining, in a case that there is no overlapped PDSCH in the second candidate set, the second candidate set as the receiving PDSCH set; and, performing step 2 in a case that the quantity of PDSCHs in the second candidate set does not meet the receiving capability of the terminal, or there is an overlapped PDSCH in the second candidate set;

step 2: using the second candidate set as the candidate PDSCH set, and repeating the step 1;

wherein a candidate PDSCH is a PDSCH scheduled by the base station before receiving a target time threshold of a time slot, and a priority of a PDSCH scheduled before the target time threshold is higher than a priority of a PDSCH scheduled after the target time threshold.

10. The apparatus according to claim 9, wherein the determining, the receiving PDSCH set according to the priority of the candidate PDSCH scheduled by the base station comprises:

determining the receiving PDSCH set according to PDSCH with a highest priority in the candidate PDSCH set, wherein the quantity of PDSCHs to be received in the receiving PDSCH set meets the receiving capability of the terminal.

11. The apparatus according to claim 10, wherein the determining the receiving PDSCH set according to the PDSCH with the highest priority in the candidate PDSCH set, specially comprises:

step 1: determining a first PDSCH with the highest priority in the candidate PDSCH set as the PDSCH to be received in the receiving PDSCH set; determining, in a case that total quantity of PDSCHs to be received in the receiving PDSCH set reaches maximum receiving capability of the terminal, the receiving PDSCH set comprising the first PDSCH as the receiving PDSCH set; and performing step 2 in a case that total quantity of PDSCHs to be received in the receiving PDSCH set does not reach the maximum receiving capability of the terminal;

step 2: deleting the first PDSCH from the candidate PDSCH set, and deleting a second PDSCH in the candidate PDSCH set, and using a candidate PDSCH set after deleting the first PDSCH and the second PDSCH as a first candidate set, wherein the second PDSCH is a PDSCH that overlaps with all PDSCHs in the receiving PDSCH set; using, in a case that the first candidate set is not an empty set, the first candidate set as the candidate PDSCH set, and repeating the step 1, determining, in a case that the first candidate set is an empty set, the receiving PDSCH set comprising the first PDSCH as the receiving PDSCH set.

12. The apparatus according to claim 11, wherein when the processor executes the computer program, further configured to implement the following steps of:

determining, in a case that two PDSCHs meet a first condition, that the two PDSCHs do not overlap in a time domain, wherein the first condition is: a start time of one of the two PDSCHs is later than an end time of the other PDSCH.

13. The apparatus according to claim 11, wherein when the processor executes the computer program, further configured to implement the following steps of:

determining, in a case that the two PDSCHs meet a second condition, that the two PDSCHs do not overlap in a frequency domain, wherein the second condition is: a start resource block RB index number of one of the two PDSCHs is greater than an end RB index number of the other PDSCH.

14. The apparatus according to claim 9, wherein the processor is further configured to implement, when executing the computer program, the following steps of:

receiving, in a case that the quantity of PDSCHs to be received does not meet maximum receiving capability of the terminal, data on PDSCH that do not overlap in the time domain or frequency domain, according to a time sequence of PDSCH scheduled by the base station after the target time threshold.

15. The apparatus according to claim 9, wherein when the processor executes the computer program, further configured to implement the following steps of:

determining, in a case that two PDSCHs meet a first condition, that the two PDSCHs do not overlap in a time domain, wherein the first condition is: a start time of one of the two PDSCHs is later than an end time of the other PDSCH.

16. A processor-readable storage medium, on which computer program is stored, wherein when the computer program is executed by a processor, steps of a method for receiving PDSCH are implemented, the method comprising:

determining a receiving PDSCH set according to a priority of a candidate physical downlink shared channel PDSCH scheduled by a base station, wherein a quantity of PDSCHs to be received in the receiving PDSCH set meets receiving capability of the terminal;

receiving, by the terminal, data on the PDSCH to be received in the receiving PDSCH set;

wherein the determining the receiving PDSCH set according to the priority of the candidate PDSCH scheduled by the base station comprises:

excluding PDSCH with a lowest priority in the candidate PDSCH set, and determining the candidate PDSCH set subjected to the exclusion process as the receiving PDSCH set, wherein the quantity of PDSCHs to be received in the receiving PDSCH set meets the receiving capability of the terminal;

wherein the excluding the PDSCH with the lowest priority in the candidate PDSCH set, and the determining the candidate PDSCH set subjected to the exclusion process as the receiving PDSCH set, comprises:

step 1: deleting a second PDSCH with a lowest priority in the candidate PDSCH set to obtain a second candidate set, wherein when the quantity of PDSCHs in the second candidate set meets the receiving capability of the terminal, determining, in a case that there is no overlapped PDSCH in the second candidate set, the second candidate set as the receiving PDSCH set; and performing step 2 in a case that the quantity of PDSCHs in the second candidate set does not meet the receiving capability of the terminal, or there is an overlapped PDSCH in the second candidate set;

step 2: using the second candidate set as the candidate PDSCH set, and repeating the step 1;

wherein a candidate PDSCH is a PDSCH scheduled by the base station before receiving a target time threshold of a time slot, and a priority of a PDSCH scheduled before the target time threshold is higher than a priority of a PDSCH scheduled after the target time threshold.

* * * * *